United States Patent [19]
Alexander, Jr. et al.

[11] Patent Number: 6,091,732
[45] Date of Patent: Jul. 18, 2000

[54] METHOD FOR CONFIGURING DISTRIBUTED INTERNET PROTOCOL GATEWAYS WITH LAN EMULATION

[75] Inventors: Cedell Adam Alexander, Jr., Durham; Jimmy Philip Ervin, Raleigh; John Lloyd, Durham; Richard Colbert Matlack, Jr.; Deepak Vig, both of Raleigh, all of N.C.

[73] Assignee: Cisco Systems, Inc., San Jose, Calif.

[21] Appl. No.: 08/975,481

[22] Filed: Nov. 20, 1997

[51] Int. Cl.$^7$ ..................................................... H04L 12/28
[52] U.S. Cl. ............................................. 370/401; 370/389
[58] Field of Search ...................................... 370/389, 401, 370/410; 709/202, 203, 204, 227, 245, 225

[56] References Cited

U.S. PATENT DOCUMENTS

| | | | |
|---|---|---|---|
| 5,115,433 | 5/1992 | Baran et al. | 370/94.3 |
| 5,329,527 | 7/1994 | Ujihashi et al. | 370/85.13 |
| 5,357,508 | 10/1994 | Le Boudec et al. | 370/58.3 |
| 5,420,862 | 5/1995 | Perlman | 370/85.13 |
| 5,444,702 | 8/1995 | Burnett et al. | 370/60.1 |
| 5,490,139 | 2/1996 | Baker et al. | 370/60 |
| 5,570,359 | 10/1996 | Nguyen | 370/60 |
| 5,577,033 | 11/1996 | Chang et al. | 370/60 |
| 5,581,552 | 12/1996 | Civanlar et al. | 370/396 |
| 5,600,644 | 2/1997 | Chang et al. | 370/404 |
| 5,636,216 | 6/1997 | Fox et al. | 370/402 |
| 5,636,217 | 6/1997 | Moelard | 370/338 |
| 5,920,699 | 7/1999 | Bare | 709/225 |

OTHER PUBLICATIONS

IBM Technical Disclosure Bulletin, V37, #10, Oct. 1994 "Addressing Source Routing in an ATM Emulated LAN".
IBM Technical Disclosure Bulletin, V39, #08, Aug. 1996 "Method for Improving Network Availability with Redundant Network Servers".

*Primary Examiner*—Chi H. Pham
*Assistant Examiner*—Brenda H. Pham
*Attorney, Agent, or Firm*—Cesari and McKenna

[57] ABSTRACT

A communication network having a plurality of routers, each connected to a host system by a LAN network and interconnected by a switched network, the common network using a shared or common IP and MAC address in the routers forming a subnet. Host systems on the same subnet use the shared or common IP address as their default gateway address when accessing host systems on another subnet.

12 Claims, 2 Drawing Sheets

METHOD FOR CONFIGURING DISTRIBUTED INTERNET PROTOCOL GATEWAYS WITH LAN EMULATION

BACKGROUND

The prior art data communication network illustrated in FIG. 1 includes a plurality of routers such as Local Area Network (LAN) switches having Internet Protocol (IP) routing capability. The LAN switches are connected by a switched network (such as an ATM network) to each other and to LAN emulation clients (LECs) which are directly connected to the ATM network. The LAN switches are connected via ports to several LANs such as Ethernet and/or Token Ring segments. The LECs join emulated LANs (ELANs) and forward data packets to other LECs on the same ELAN over the ATM network. The LAN ports connect to hosts or other communicating stations via, for example, an Ethernet or Token Ring LAN segment.

In FIG. 1, three LAN switches A, B and C are connected to an ATM network. LAN switches A and B provide both router and bridge functions while LAN switch C provides a bridge function only. A router D and a host system E (acting as a LEC) are directly connected to the ATM network. LAN switch A has a segment 10 connected to its LAN port. A host system 1 is connected to segment 10. Another segment 11 is connected to the LAN port on LAN switch B. Two host systems 2 and 4 are connected to segment 11. Another segment 12 is connected to LAN switch C. A host system 3 is connected to segment 12.

In FIG. 1, host 1 has the IP address A.11 on subnet A. Host 2 has the IP address A.12 on subnet A. Host 3 has the IP address A.13 on subnet A. Host 4 has the IP address B.14 on subnet B. Host E has the IP address B.11 on subnet B. The addresses of the default gateways configured for hosts 1, 2, 4 and E are A.2, A.3, B.3 and B.1, respectively. LAN switch A has IP addresses A.2 on subnet A and B.2 on subnet B; its MAC address is M.2. LAN switch B has IP addresses A.3 on subnet A and B.3 on subnet B; its MAC address is M.3. LAN switch C does not have routing capability. Central router D has IP addresses A.1 on subnet A and B.1 on subnet B; its' MAC address is M.1.

Hosts or other stations require a router to communicate with other hosts or stations on IP subnets other than their own. Hosts specify their router with the configured default gateway address. The router function for host 1 is provided by an internal router in LAN switch A. LAN switch B provides the function for hosts 2 and 4. The router D provides this function for host 3 which is attached to LAN switch C.

When the illustrated network is initially configured the routers are provided with unique Medium Access Control (MAC) addresses and Internet Protocol (IP) addresses (see the assigned addresses described above and illustrated in FIG. 1). The host systems connected to the segments are configured with their own IP addresses and the address of their default gateway (DGW) for accessing devices not located on the same IP subnet. As long as the network connection remain static this method for operating the network is satisfactory. However, if a device (such as one or more of the host systems) is moved from one segment to another, without reconfiguring the DGW of the device which has moved, an inefficiency is introduced.

For example, if host 2 is moved from segment 11 to segment 10 and needs to communicate with host E, it will forward the packets to its default gateway A.3. The bridge function in LAN switch A will forward the packet over the ATM network to LAN switch B (which is configured with IP address A.3). The router function in LAN switch B will forward the packet via the ATM network to the destination host E. Thus all communications between host 2 and host E will make two trips across the ATM network as opposed to one if host 2 had not been moved from segment 11 to segment 10.

Two solutions have been proposed to address the problem created when a station such as host 2 moves from one segment served by one router to another served by a different router. Both are unsatisfactory. The first solution is to provide a single central router to serve all hosts or stations on all LAN segments. This solution, however, is not workable (especially if large networks are employed) since it results in a bottleneck at the central router. The other solution is to reconfigure the DGW whenever an end station is moved. This solution is equally unattractive since it imposes a severe administrative problem.

SUMMARY OF THE INVENTION

The invention contemplates a method for configuring a communication network which includes a number of hosts on different subnets, each host being physically connected via a LAN segment to a number of LAN switches. The LAN switches are connected to an ATM network and one or more hosts on one or more subnets are attached directly to the ATM network. All of the LAN switches, which have router function, are configured with at least the same IP address and the same MAC address. The routers in the LAN switches recognize only the common or shared address when they receive an IP ARP from an attached segment. A single router attached to the ATM network could also be configured with the common addresses and responds to this addresses when an IP ARP is received over the ATM network. Hosts attached to the LAN networks are configured with the common IP address as their DGW IP address.

DETAILED DESCRIPTION OF THE INVENTION

Figure 1:
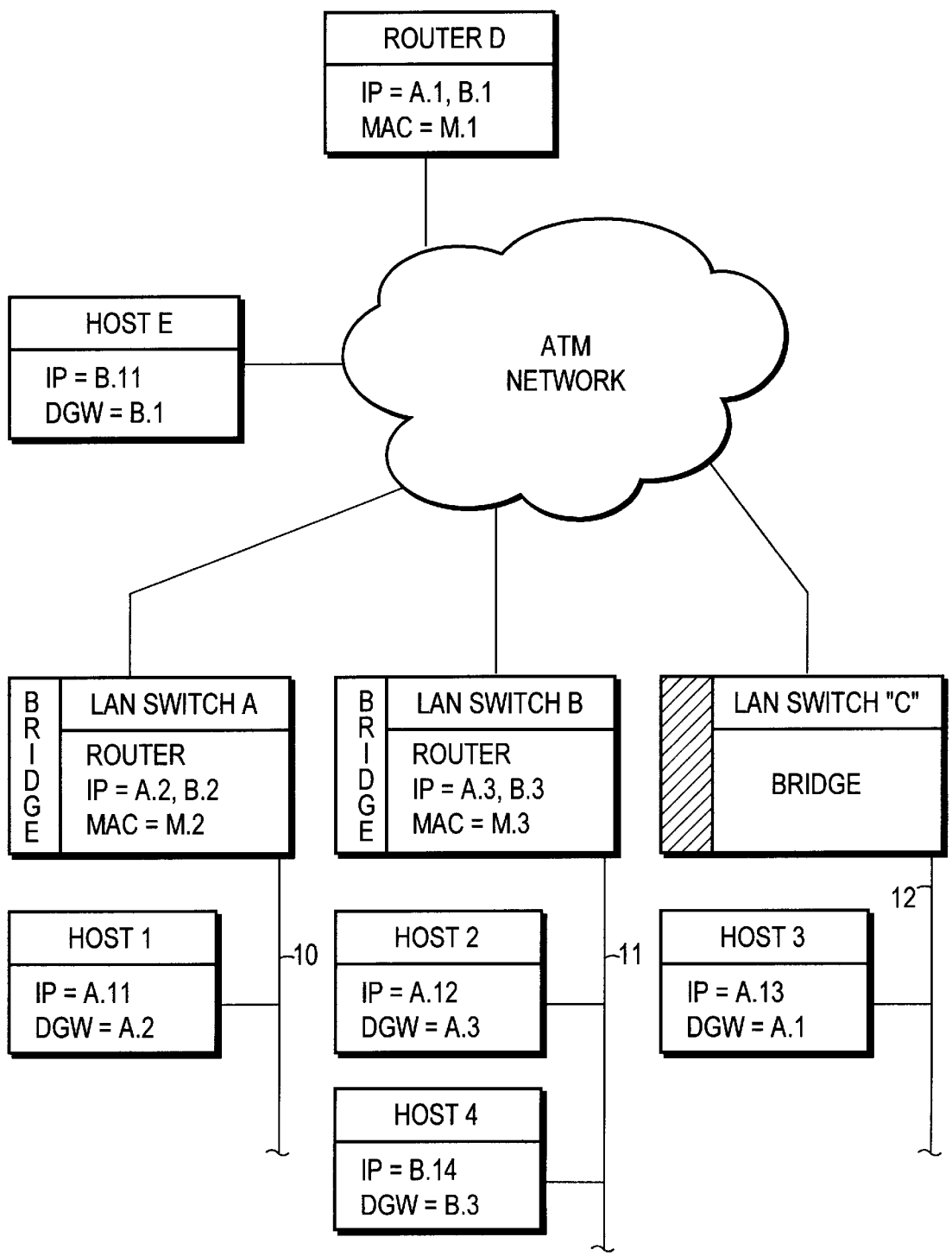
FIG. 1 is a block diagram of a network configured according to the prior art; and, FIG. 2 is a block diagram of a network configured in accordance with the invention.
Figure 2:
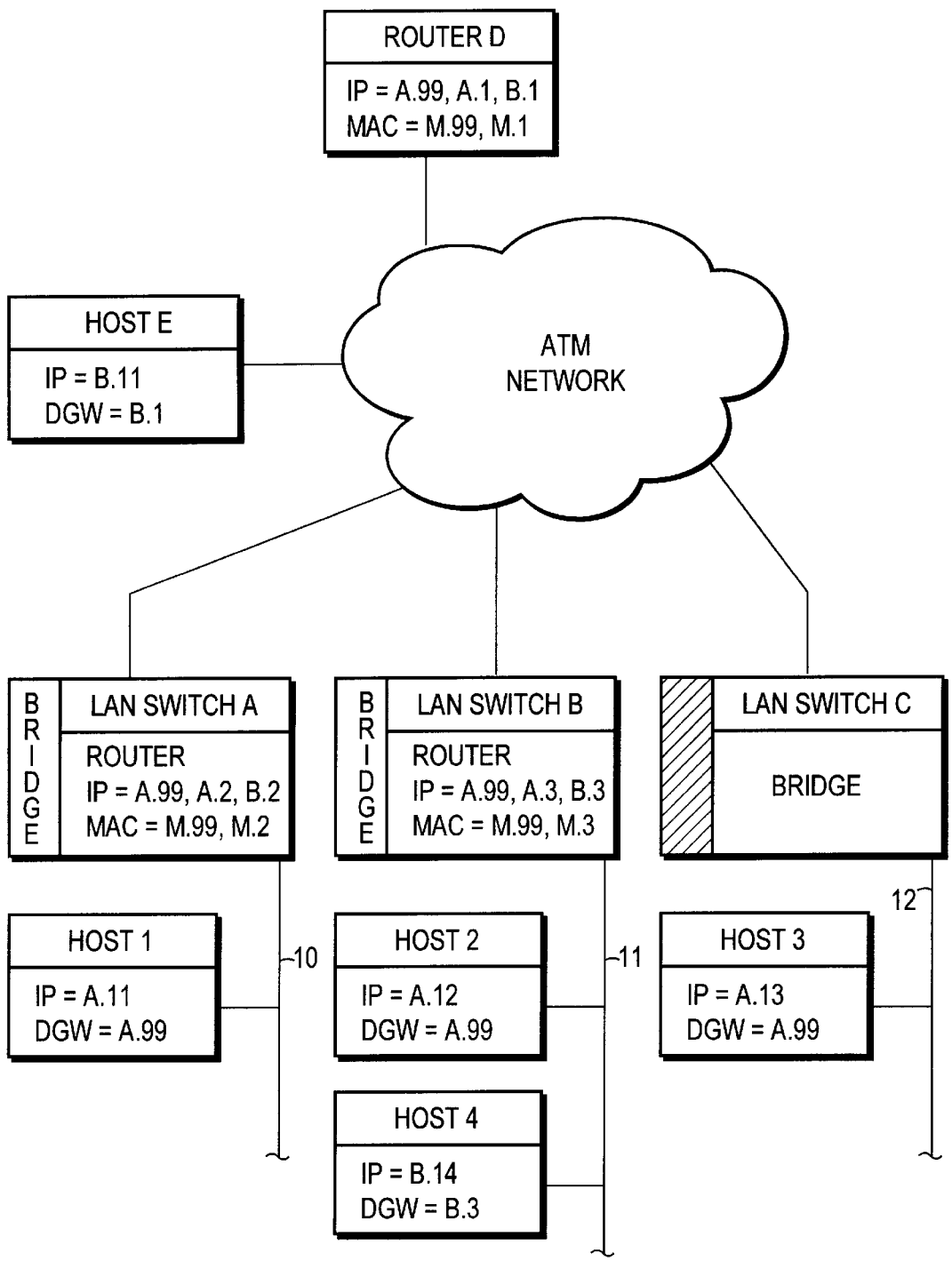

In FIG. 2, the components making up the network are similar to those illustrated in the prior art network of FIG. 1. However, the configuration of the network has been changed to incorporate the invention.

The routers in LAN switches A and B include a common IP address A.99 and a common MAC address M.99. These two common addresses are also configured in router D attached to the ATM network. In addition, the routers in LAN switches A and B include additional unique IP and MAC addresses as would be required by the specific network being configured. These additional addresses are used in a conventional manner. Only the use of the common IP and MAC addresses is related to the invention as will be explained below.

Host 1, connected to a LAN port of switch A by segment 10 is configured with a DGW of A.99. Hosts 2 and 4, connected to a LAN port of LAN switch B by segment 11 are also configured with a DGW of A.99 and B.3, respectively. Host 3 connected to LAN switch C by segment 12 has also been configured with its DGW of A.99.

The configuration illustrated in FIG. 2 and described above allows many LAN switches (LAN switches A and B for example) used in conjunction with a central router (router D for example) to form a distributed router. Each LAN switch provides an interface to the distributed router using the same IP and MAC addresses (IP address A.99 and MAC address M.99 for example). In addition, (the central router D for example) connected directly to the ATM network is also configured with these same addresses and provides an interface to the distributed router to hosts or stations having a DGW of A.99, but not directly connected to a LAN switch with routing function incorporating the invention.

Having the same IP and MAC address on many LAN switches and on a central router permits hosts to be relocated in the network without having to be reconfigured. It also prevents unnecessary network traffic across the ATM network when hosts on different subnets communicate.

For example, a host configured with the common default gateway address A.99 can move from a LAN segment attached to one LAN switch with routing function to a different segment attached to another LAN switch with routing function, and the closest LAN switch will route packets for the moved host. If the host moves from a segment attached to a LAN switch with routing function to a segment attached to a LAN switch without routing function, the central router (D) will perform the routing function for the moved host.

If a second bridged path exists between LAN segments attached to two or more LAN switches containing routing function configured as a distributed gateway described above, the configuration provides a fault tolerant router interface for hosts on the LAN segments. The standard spanning tree protocol function inside the bridge and the LAN switches will block the second bridge path to the segment connected to the failed LAN switch. Hosts configured with the common default gateway IP address A.99 and connected to the segment attached to the failed LAN switch can now use the routing function in another LAN switch connected by the second bridged path.

Since the router interfaces on many LAN switches and the central router have the same IP and MAC addresses (A.99 and M.99), steps must be taken, in the LAN switches to ensure that the shared IP and MAC addresses only propagate onto the LAN segments attached to the LAN switches. The LAN switches must be programmed to ignore ARPs directed to the shared IP address (A.99) which are received from the ATM network uplink. In addition, the LAN switch must be programmed to block receipt, only on the ATM uplink, of all packets having the shared MAC address M.99 as the target address. In order to reduce unnecessary ATM traffic, it is desirable that the LAN switches with routers not propagate ARP requests for IP address A.99 over the ATM uplink.

Since the LAN switches' router interfaces need to forward packets through the ATM network on some occasions, the interface are configured with additional unique MAC addresses (M.2 and M.3) and IP addresses (A.2, B.2, A.3, B.3). MAC M.2, for example, passes through the ATM interface, and the LAN switch A answers ARPs for A.2 as well as the other unique IP addresses no matter which port the LAN switch receives the packet from.

If the invention is to be extended to an additional subnet, the LAN switches (A and B) and the central router (D) must be provided with a shared or common IP and MAC address assigned to the additional subnet (for example B.98 and M.98) and the hosts on that subnet must be configured with the shared IP address as their default gateway address. The added shared IP and MAC address perform the same function for hosts on the B subnet as described above with respect to hosts on the A subnet.

While a single embodiment of the invention has been illustrated and described it will be apparent to those skilled in the art that changes may be made in the details without departing from the spirit and scope of the invention.

We claim:

1. A method for configuring a communication network having: i) a plurality of network switches, at least some of the network switches having routing capabilities, each network routing switch further having a unique internet protocol (IP) address, ii) a plurality of local area networks (LANs), each LAN having at least one communicating device with a unique IP address, each LAN further connected to a corresponding network routing switch, and iii) a switched network connected to the plurality of network routing switches, said method comprising the steps of:

defining a first subnet, said first subnet comprising a set of selected network routing switches and a set of selected communication devices;

assigning a common IP address and a common medium access control (MAC) address to each of the network routing switches in said set of selected network routing switches; and assigning said common IP address as a gateway address to each of the communication devices in said set of selected communication devices.

2. The method of claim 1 further comprising the step of configuring of the network routing switches in said set of selected network routing switches to ignore address resolution protocols directed to said common IP address from the communications network.

3. The method of claim 1 further comprising the step of configuring each of the network routing switches in said set of selected network routing switches to respond to said common IP address only when received from a LAN connected to another network switch in said set of selected network routing switches.

4. The method of claim 1 further comprising the steps of:

defining a second subnet, said second subnet comprising a second set of selected network routing switches and a second set of selected communication devices;

assigning a second common IP address and a second common MAC address to each of the network routing switches in said second set of selected network routing switches; and assigning said second common IP address as a gateway address to each of the communication devices in said second set of selected communication devices.

5. The method of claim 4 further comprising the step of configuring each of the network routing switches in said second set of selected network routing switches to ignore address resolution protocols directed to said second common IP address from the communications network.

6. The method of claim 4 further comprising the step of configuring each of the network routing switches in said second set of selected network routing switches to respond to said second common IP address only when received from a LAN connected to another routing switch in said second set of selected network routing switches.

7. A method for configuring a communication network having: i) a plurality of network switches, at least some of the network switches having routing capabilities, each network routing switch further having a unique internet protocol (IP) address, ii) a plurality of local area networks (LANs), each LAN having at least one communicating device with a unique IP address, each LAN further connected to a corresponding network switch, iii) a central router having a unique IP address, and iv) a switched network connected to the central router and to the plurality of network routing switches, said method comprising the steps of:

defining a first subnet, said first subnet comprising the central router, a set of selected network routing switches, and a set of selected communication devices;

assigning a common IP address and a common medium access control (MAC) address to the central router;

assigning said common IP address and said common MAC address to each of the network routing switches in said set of selected network routing switches; and assigning said common IP address as a gateway address to each of the communication devices in said set of selected communication devices.

8. The method of claim 7 further comprising the steps of:

configuring the central router to ignore address resolution protocols directed to said common IP address from the communications network; and configuring each of the network routing switches in said set of selected network routing switches to ignore address resolution protocols directed to said common IP address from the communications network.

9. The method of claim 7 further comprising the steps of:

configuring the central router to respond to said common IP address only when received from a LAN connected to another network routing switch in said set of selected network routing switches; and configuring each of the network routing switches in said set of selected network routing switches to respond to said common IP address only when received from a LAN connected to another network switch in said set of selected network routing switches.

10. The method of claim 7 further comprising the steps of:

defining a second subnet, said second subnet comprising the central router, a second set of selected network routing switches, and a second set of selected communication devices;

assigning a second common IP address and a second common MAC address to the central router;

assigning said second common IP address and said second common MAC address to each of the network routing switches in said second set of selected network routing switches; and assigning said second common IP address as a gateway address to each of the communication devices in said second set of selected communication devices.

11. The method of claim 10 further comprising the step of configuring each of the network routing switches in said second set of selected network routing switches to ignore address resolution protocols directed to said second common IP address from the communications network.

12. The method of claim 10 further comprising the step of configuring each of the network routing switches in said second set of selected network routing switches to respond to said second common IP address only when received from a LAN connected to another network routing switch in said second set of selected network routing switches.

* * * * *